(12) United States Patent
Ardavanis

(10) Patent No.: US 9,638,351 B2
(45) Date of Patent: May 2, 2017

(54) VESSEL WITH STINGER HANDLING SYSTEM

(71) Applicant: Petrofac Services Ltd, London (GB)

(72) Inventor: Kimon Tullio Ardavanis, Sharjah (AE)

(73) Assignee: Petrofac Services Ltd., London (GB)

( * ) Notice: Subject to any disclaimer, the term of this patent is extended or adjusted under 35 U.S.C. 154(b) by 0 days.

(21) Appl. No.: 15/039,465

(22) PCT Filed: Nov. 26, 2014

(86) PCT No.: PCT/EP2014/075676
§ 371 (c)(1),
(2) Date: May 26, 2016

(87) PCT Pub. No.: WO2015/078918
PCT Pub. Date: Jun. 4, 2015

(65) Prior Publication Data
US 2016/0377196 A1    Dec. 29, 2016

(30) Foreign Application Priority Data
Nov. 26, 2013   (GB) .................................... 1320842.6

(51) Int. Cl.
*B63B 35/03* (2006.01)
*F16L 1/225* (2006.01)
*B66C 23/52* (2006.01)

(52) U.S. Cl.
CPC .............. *F16L 1/225* (2013.01); *B63B 35/03* (2013.01); *B66C 23/52* (2013.01)

(58) Field of Classification Search
CPC ... F16L 1/225; F16L 1/18; F16L 1/205; F16L 1/202; F16L 1/235; B63B 35/03; B63B 27/36; B66C 23/52
USPC ........................ 405/158, 166, 168.1; 212/307
See application file for complete search history.

(56) References Cited

U.S. PATENT DOCUMENTS

| 4,257,718 A * | 3/1981 | Rosa ........................ B63B 35/03 114/265 |
| 5,011,333 A * | 4/1991 | Lanan ........................ F16L 1/23 405/166 |
| 7,328,811 B2 * | 2/2008 | Roodenburg ........... B66C 13/06 212/232 |
| 2010/0189513 A1 * | 7/2010 | Alloggio ................. B63B 35/03 405/166 |
| 2011/0031205 A1 * | 2/2011 | Roodenburg ........... B66C 13/06 212/309 |
| 2011/0052324 A1 * | 3/2011 | Bruschi ................... B63B 35/03 405/166 |

(Continued)

*Primary Examiner* — Sunil Singh
*Assistant Examiner* — Carib Oquendo
(74) *Attorney, Agent, or Firm* — NLO N.V.; Minerva Rivero; Catherine A. Schultz

(57) ABSTRACT

A pipelay vessel has a crane having a base with a hollow interior and a stinger handling system for handling a stinger extending from the side of the vessel. The stinger handling system has a link extending out through an opening from the hollow interior towards the side of the vessel for connection to the stinger. The link is arranged to transmit both tensile and compressive loading. A jack structure, located within the hollow interior of the crane base is mounted to extend and retract the link from within the crane base to raise and lower the stinger. A universal coupling may be provided for self aligning the link to the stinger in the horizontal plane.

20 Claims, 8 Drawing Sheets

(56) References Cited

U.S. PATENT DOCUMENTS

2014/0334880 A1\* 11/2014 Roodenburg ............. F16L 1/18
405/166

\* cited by examiner

VESSEL WITH STINGER HANDLING SYSTEM

BACKGROUND OF THE INVENTION

1. Field of the Invention

The present invention relates to vessels for laying pipe and in particular to a stinger handling system for such a vessel. The invention also relates to the use of such a device in the deployment of a stinger.

2. Description of the Related Art

Pipelay vessels are generally known in various configurations. They may be broadly divided into three main principles of operation, namely J-lay vessels for deep water, near vertical pipe deployment, S-lay horizontal or low angle deployment and reel lay, where a continuous pipe is unwound from a reel. As the pipe is deployed from the vessel, it will tend to follow a catenary or similar curve towards the seabed, in order to provide the transition between this curve and the region onboard the vessel, a support structure is generally provided extending from the vessel and guiding the first portion of the pipe to its point of release. These support structures are known as stingers and for S-lay operation generally extend outwards from the stern of the vessel for considerable meters. Stingers may be constructed in sections and can be raised, lowered and extended as required. It is also generally necessary that the stinger can be completely removed e.g. after completion of the pipelay operation.

One device for stinger deployment is shown in US2012219362, which has a gantry construction over the stern of the vessel which supports the stinger by a cable. Use of a cable allows the gantry to support the weight of the stinger and the pipe but precludes however the absorption of compressive loads or uplift on the stinger or pipe. Increasingly, vessels are required to perform a multitude of functions including heavy lift operations. To this end, a heavy lifting crane at the stern of a vessel may sometimes be necessary. Clearly a heavy lifting crane cannot be located within the same space as a gantry for supporting the stinger. Another vessel is disclosed in WO05123566 having a heavy lift facility at the stern of the vessel. The crane includes a cable and winch arrangement at an elevated position on the crane body for supporting and lifting the stinger. A telescopic boom arrangement using hydraulic jacks is also contemplated.

While the existing devices and systems may be suitable for many circumstances, it would be desirable to provide a stinger handling system that is better integrated into the vessel structure and can be easily removed or stowed when not in use.

BRIEF SUMMARY OF THE INVENTION

According to the invention there is provided a pipelay vessel provided with a crane, the crane having a base supported on a structure of the vessel adjacent to a side of the vessel, the base having a hollow interior, the vessel further being provided with a stinger handling system for handling a stinger extending from the side of the vessel, the stinger handling system comprising: a link extending out through an opening from the hollow interior towards the side of the vessel for connection to the stinger, the link being arranged to transmit both tensile and compressive loading; and a jack structure, located within the hollow interior of the crane base and mounted to extend and retract the link from within the crane base to raise and lower the stinger. By providing the jack structure within the body of the crane, numerous advantages are achievable. Firstly, all of the moving and machined components of the jack structure are enclosed in the crane base which is an enclosed space protected from the environment. In addition, to protection of these components, repair and operation is facilitated by providing access to the hollow interior of the crane for personnel. This access may also be sufficient for small lifting equipment such as a fork-lift vehicle. A further advantage is that the footprint outside the crane base of the whole system is minimal, being only the stinger itself and the link. The space around the crane base is thus optimised for other operations.

The crane may be any heavy lifting crane suitable for performing operations over the side of the vessel. In general, S-lay pipelay will take place over the stern of the vessel and reference to the side of the vessel will include any side or board of the vessel but most particularly the stern. Preferably, the crane is a tub crane having a generally circular or polygonal hollow base on which the main crane structure is mounted for rotation. The crane preferably has a nominal lifting capacity of at least 2000 T and may be more than 5000 T. The base may have a dimension of at least 15 meters in diameter and may be more than 20 meters in diameter. It will be understood that the base dimension will determine the maximum possible length of the link that can be retracted into the interior of the base. It is nevertheless also possible to arrange for the link to protrude out through an opposite side of the base once fully retracted or allow for an extension on the base at this side. In one particular embodiment, the link may be provided with a junction piece allowing it to be broken down into two pieces.

The base may be a completely enclosed or otherwise weatherproof structure. As indicated above, suitable access doors and hatches may be provided to the interior. The opening provided to allow the link to extend out from the interior for connection to the stinger may be provided with a closure too for closing the opening after retraction or removal of the link. Preferably, the opening is in the form of a vertical slot in the base allowing tilting of the link during extension and retraction.

In a most preferred embodiment, the jack structure is located adjacent to the opening within the hollow interior of the crane base. For a conventional configuration in which the stinger extends from the stern of the vessel, the opening will be located adjacent the stern and the jack structure will be located at the stern side of the base. Preferably, the jack structure is located between the horizontal axis and a free end of the link. In this configuration, the jack structure effectively operates in compression in that it pushes to push in the direction of the free end of the link in order to raise the stinger, thereby inducing only tension forces in the link.

Most preferably, the jack structure is pivotably mounted to the crane base for rotation about a horizontal axis. To maximise the flexibility of movement, while minimising the size of the opening in the base, the horizontal axis may be located adjacent to the opening. The jack structure may be connected to the pivoting axis through a universal joint in order to self align the link to the stinger tension frame in both horizontal and vertical planes. In this manner, the jack structure can rotate as demanded by the kinematics of the entire stinger handling system. Various jack structures may be used, including rack and pinion arrangements, dog and ratchet mechanisms and any other construction that can effectively provide controlled translational movement of the link. The jack structure preferably comprises a hydraulic machine having first and second relatively moveable grippers, each arranged to engage with the link. The grippers may be moved with respect to each other by hydraulic cylinders arranged to move the grippers through a predetermined stroke. The grippers may engage with the link in any known manner. Most preferably, the link comprises holes for engagement by pins provided on the grippers. It will be understood that each of these configurations is intended to also include its respective kinematic alternative.

In an alternative embodiment of the invention, the jack structure comprises a hydraulic machine arranged to move along a rail, the link being connected to the hydraulic machine. In its broadest sense, the term rail may be considered to encompass any structure allowing traverse of a jack structure or similar lifting device from a position distant from the side of the vessel to a position closer to the side of the vessel. This may encompass, single or multiple rails of various forms and dimensions. Preferably, the rail comprises a pair of rail sections, preferably box sections, whereby the jack structure is guided by the pair of rail sections and the link can pivot between the respective rail sections. Such a configuration gives great stability in supporting the link on either side, while allowing the link to pivot both above and below the rail, during movement of the jack structure along the rails According to an important aspect of the invention, the jack structure can be mechanically blocked at a given extension of the link. In this context, mechanically blocked is intended to refer to the fact that forces on the link are carried entirely by rigid mechanical couplings and that any jacking capability of the jacking structure is bypassed. In this manner, once the required position of the stinger has been achieved, the jacking structure can be unloaded and the position of the link is maintained by such rigid mechanical coupling. The coupling may be a pin and hole connection or the like.

Most preferably, the link is retractable into the hollow interior to a position at which the link does not extend beyond the side of the vessel. This position of the link avoids the link from interfering with other activities such as heavy lifting. The link may be moved into this position when the stinger is to be removed or after removal thereof.

Although the previous discussion has referred to a single link, most preferably the stinger handling system comprises a pair of links and a pair of jack structures, which work in parallel to raise and lower the stinger. Two links provide better stability in raising and lowering the stinger in that they give greater resistance to lateral forces. Additionally, the dimensioning of each of the links and the jacking structures is reduced.

The invention also relates to the combination of a pipelay vessel having a stinger handling system with a stinger, wherein the stinger is pivotably connected to the side of the vessel beneath the crane at a stinger pivot and is pivotably connected to the link at a link engagement point for raising and lowering the stinger. The stinger pivot is preferably a horizontal axis parallel to and outboard of the side of the vessel, in particular the stern of the vessel. In the alternative, the stinger pivot may be in the form of a spherical coupling allowing an additional degree of freedom.

Preferably, the stinger comprises a first elongate stinger section having a rigidly connected tension structure extending laterally from the first elongate stinger section to the link engagement point. The tension structure may comprise a pair of tension frames braced together, and a pipeline path along the stinger passes through the tension frame.

Most preferably, the stinger is removable at sea by disconnection from the vessel at the stinger pivot and disconnection from the link at the link engagement point, whereby the stinger can be lifted by the crane to a storage position.

The invention also relates to a method of stinger deployment on a pipelay vessel having a crane with a hollow base, the method comprising: providing a stinger handling system located at least partially within the hollow base and having a rigid link extending from the base and over a side of the vessel; pivotably connecting a stinger at the side of the vessel for pivotal movement about a stinger pivot; connecting the link to a link engagement point on the stinger at a distance from the stinger pivot; and operating the stinger handling system to raise or lower the stinger.

BRIEF DESCRIPTION OF THE DRAWINGS

The features and advantages of the invention will be appreciated upon reference to the following drawings of a number of exemplary embodiments, in which.

DESCRIPTION OF ILLUSTRATIVE EMBODIMENTS

Figure 1:
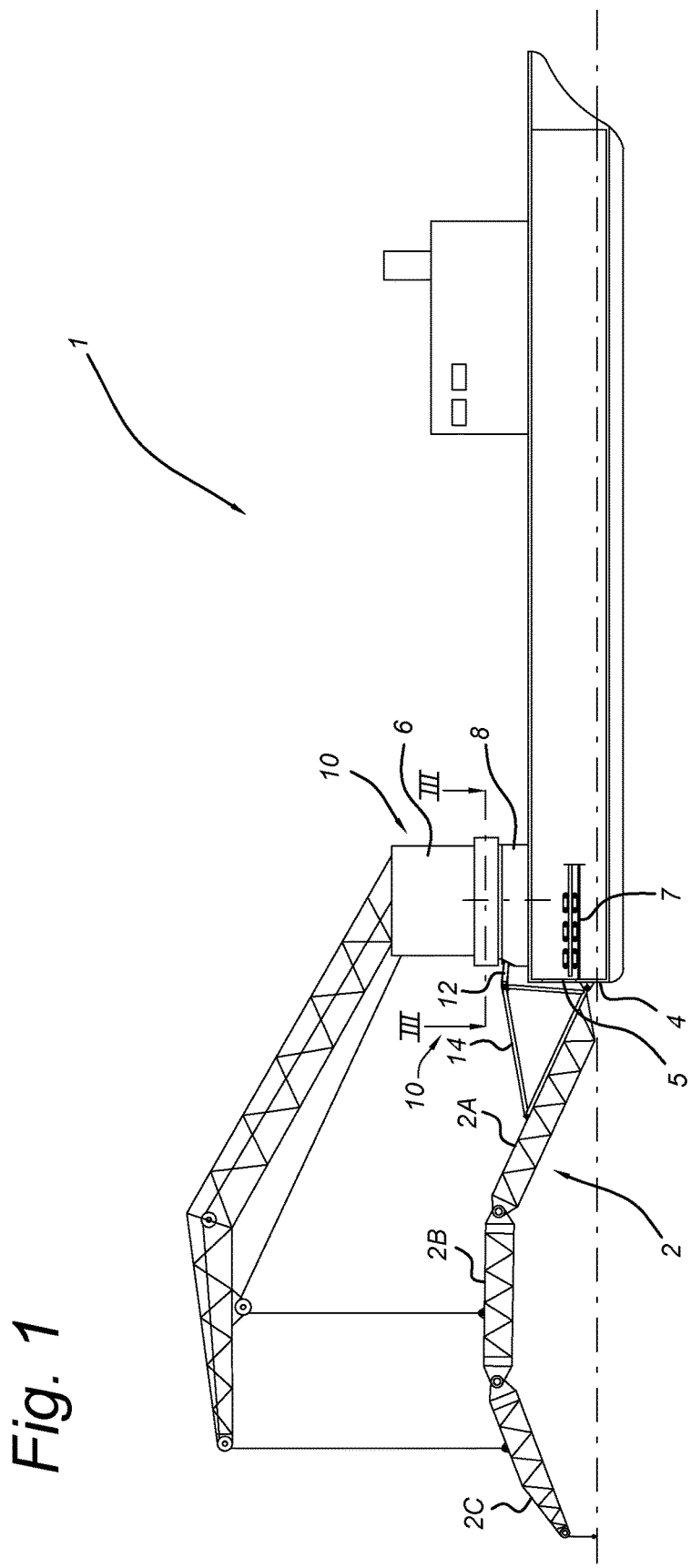
FIG. 1 shows a side elevation of a vessel according to the present invention.

FIG. 1 shows a side elevation of a vessel 1 according to the present invention having a stinger 2 mounted off the stern 4 of the vessel 1 for performing a pipelay operation. The stern 4 is provided with doors 5 giving access to an S-lay firing line 7, from which a pipeline can be deployed. The stinger 2 comprises a number of stinger sections 2A, 2B, 2C. The vessel 1 is also provided with a tub crane 6 mounted on a hollow base 8 at the stern 4 and above the stinger 2. A stinger handling system 10 includes rigid links 12 extending from the base 8 and connected to a tension structure 14 on the dorsal side of the first stinger section 2A. In the depicted view, the stinger 2 is in a position raised above the horizontal and held in position by the links 12. The second and third stinger sections 2b, 2C are supported by the crane 6.

Figure 2:
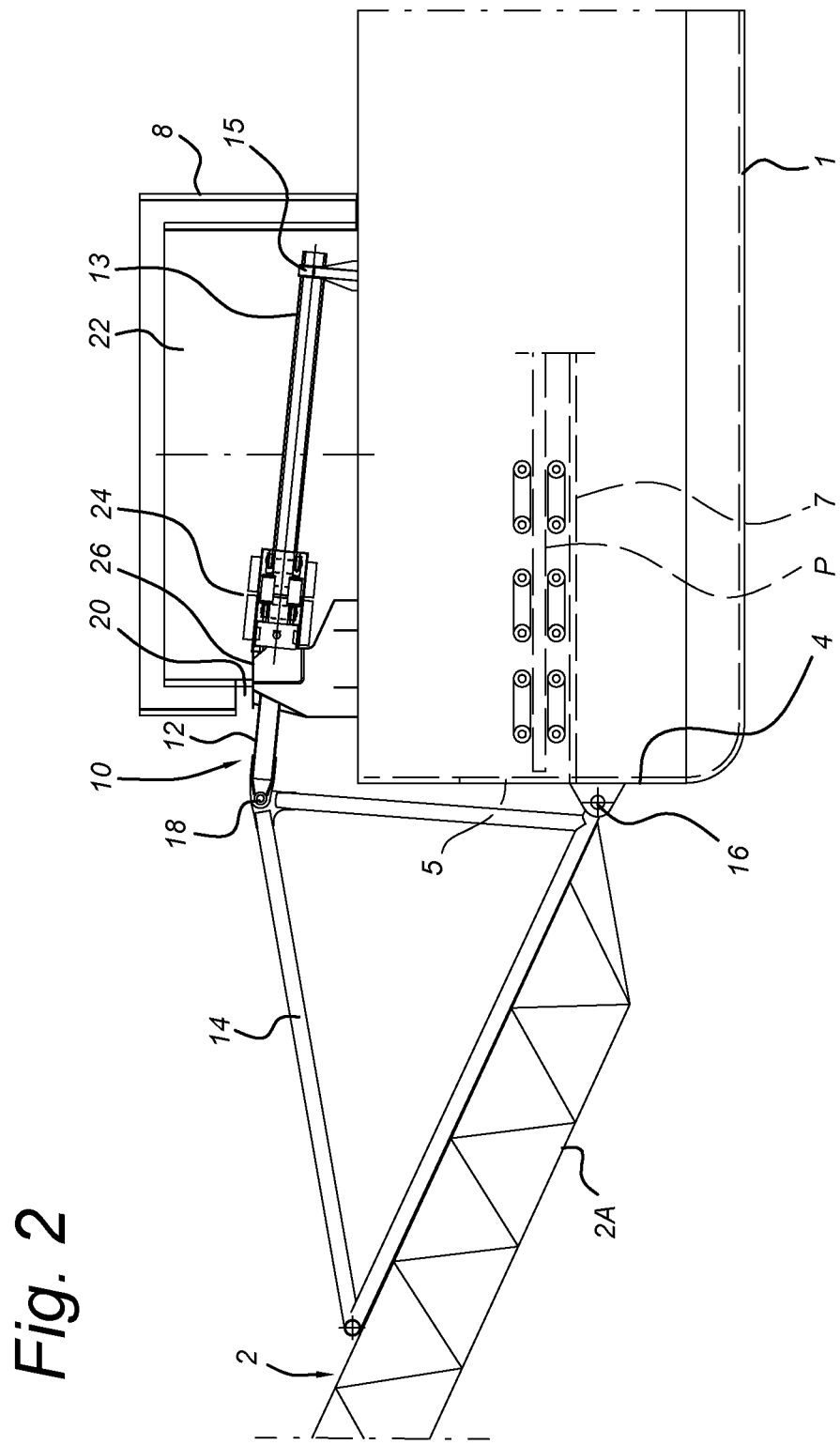
FIG. 2 shows a partial side elevation of the stinger handling system of FIG. 1.

FIG. 2 shows a partial side elevation of the stinger 2 and stinger handling system 10 of FIG. 1, in which the crane base 8 has been cut away. As can be seen, the first stinger section 2A is pivoted to the stern 4 of the vessel 1 at a horizontal stinger pivot 16 just below the firing line 7. The links 12 are connected to the tension structure 14 at a link engagement point 18. The links 12 extend through slots 20 into a hollow interior 22 of the base 8 and are each engaged by the pivoting jack structure 24, located within the hollow interior 22 and mounted on dedicated connecting brackets 26 adjacent to the slots 20. In this position, the free ends 13 of the links 12 are supported on saddles 15 at the forward end of the base 8. In the present context, forward is used to refer to the vessel direction i.e. towards the bows. It will be understood that for a different orientation of the stinger handling system 10, the movements will be reoriented accordingly.

Figure 3:
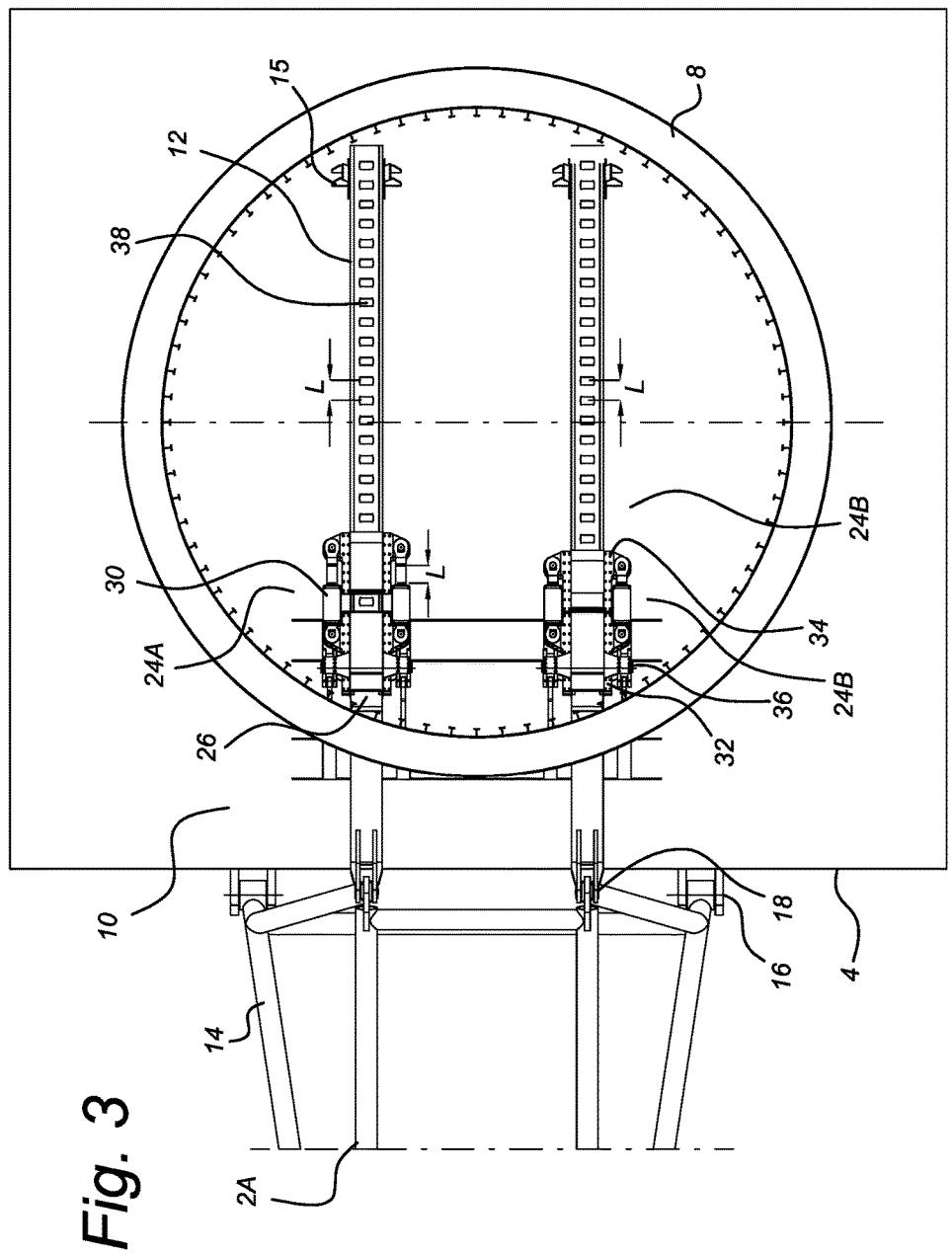
FIG. 3 shows a sectional plan view through part of the stinger handling system of FIG. 1, taken in the direction III-III.

FIG. 3 is a sectional plan view through part of the stinger handling system 10 of FIG. 1, taken in the direction III-III of FIG. 1. As can be seen in this view, the stinger handling system 10 includes two links 12 that extend parallel to each other in the fore-aft direction of the vessel 1. The jack structures 24A, B each have first and second relatively moveable grippers 32, 34. The grippers 32, 34 of each of the jack structures 24A, B are coupled together by hydraulic rams 30, in the present embodiment, two hydraulic rams 30 are provided on either side of each jack structure 24A, B. Each jack structure 24A, B is pivoted to a respective bracket 26 by engagement of the first gripper 32 at jack pivot 36. The second gripper 34 can move a stroke length L along the link in the forward direction by extension of the hydraulic rams 30. In the illustrated embodiment, the uppermost jack structure 24A is in the extended position with the second gripper 34 spaced a distance L from the first gripper 32. The lowermost jack structure 24B is in the retracted position with the second gripper 34 in contact with the first gripper 32. Also shown in FIG. 3 are holes 38 formed through the upper sides of the links 12. The holes 38 are also spaced a distance L from each other. Similar holes 38 are provided through the lower sides of the links 12.

Figure 4:
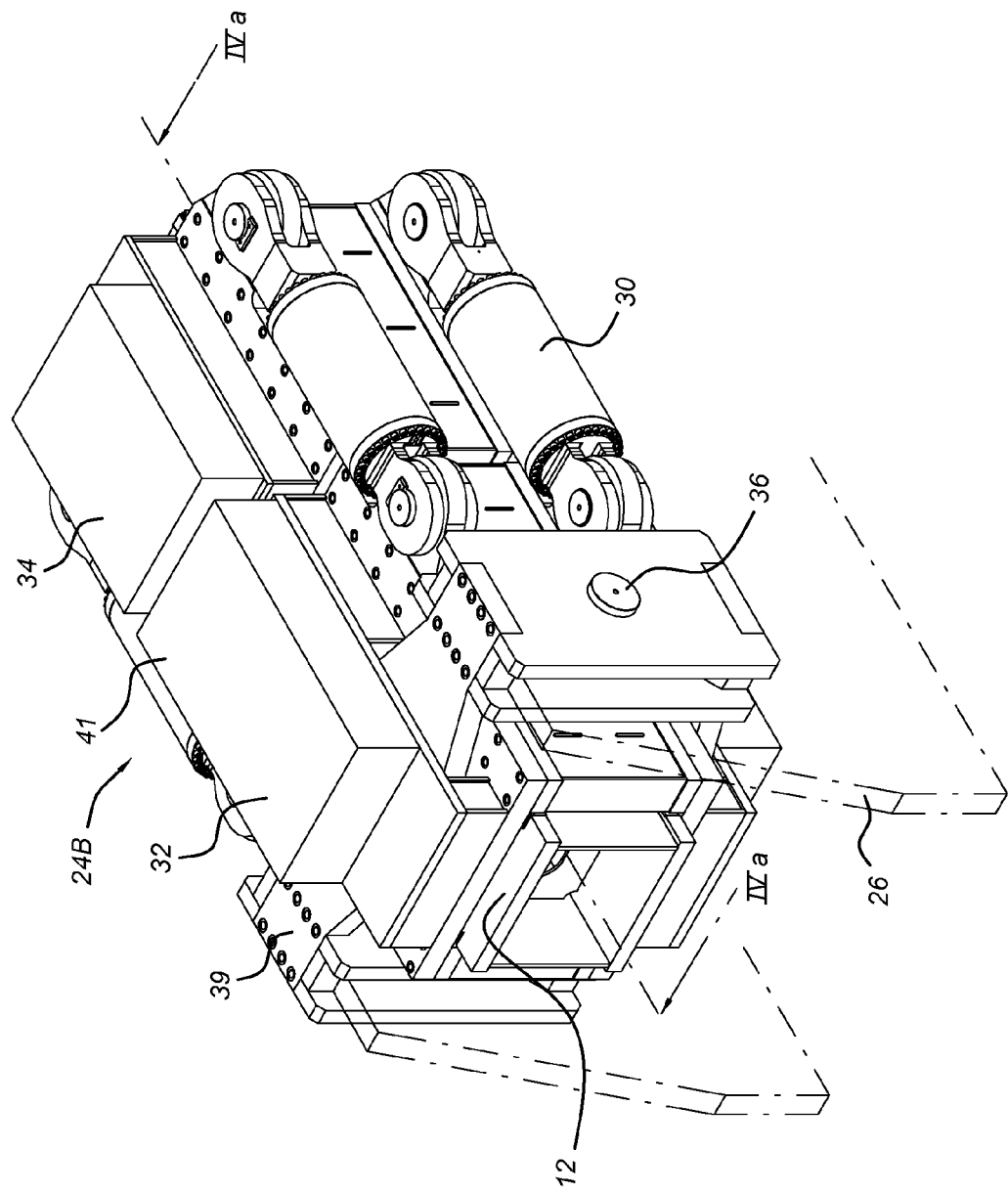
FIG. 4 shows a perspective view of the jack structure of FIG. 3.

FIG. 4 shows a perspective view of the jack structure 24B of FIG. 3. As can be seen in this view, the link 12 extends through both the first and the second grippers 32, 34 of the jacking structure 24B. Also visible are the hydraulic rams 30 connecting the first and second grippers 32, 34 together and one of the jack pivots 36 which connects the first gripper 32 to the bracket 26 through a yoke 39. Pin actuator envelopes 41 are provided top and bottom on each of the first and second grippers 32, 34.

Figure 4B:
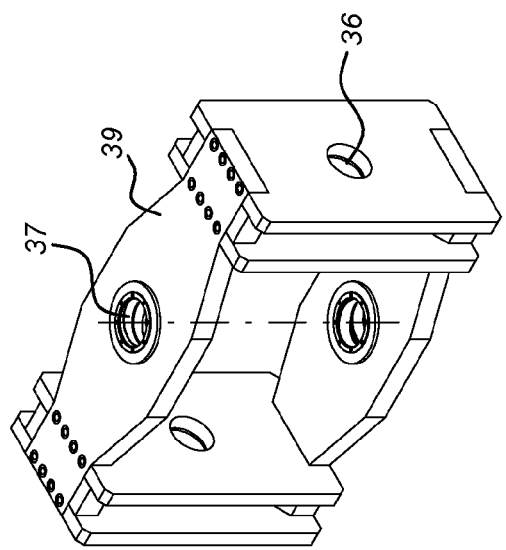
FIG. 4b shows a view of part of a yoke forming part of a universal joint.
Figure 4A:
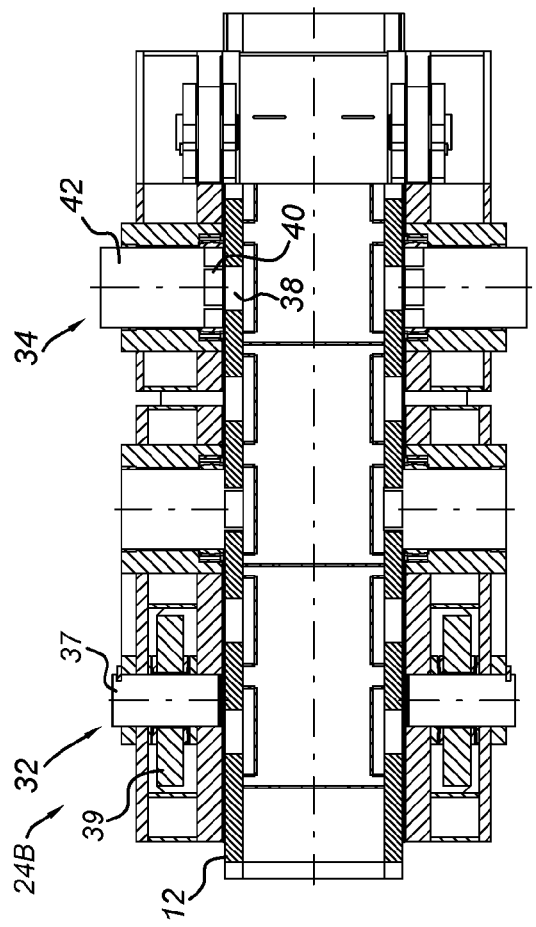
FIG. 4a shows a cross section through the jackstructure of FIG. 4 along line Iva.

FIG. 4a shows a cross-section through the jack structure 24B of FIG. 4 along line IVa, with the pin actuator envelopes 41 removed. In this view, pins 40 above and below link 12 and pin actuators 42 can be seen. The pins 40 of the first gripper 32 are engaged in two holes 38 of the link 12. Each pin actuators 42 is a hydraulic cylinder controlled by a hydraulic solenoid valve. The pins 40 of the second gripper 34 are retracted. Also visible in FIG. 4a is the vertical pivot 37, which passes through the yoke 39 and together with the jack pivot 36 forms a universal link for the jack structure 24B.

FIG. 4b shows a perspective view of the yoke 39, indicating the location of the jack pivot 36 and of the vertical pivot 37. The ability of the jack structure 24B to pivot in both the vertical plane about the jack pivot 36 and in the horizontal plane about the vertical pivot 37 ensures that the first gripper 32 can self align with the link 12 and stinger frame 14 in the horizontal plane.

Figure 5:
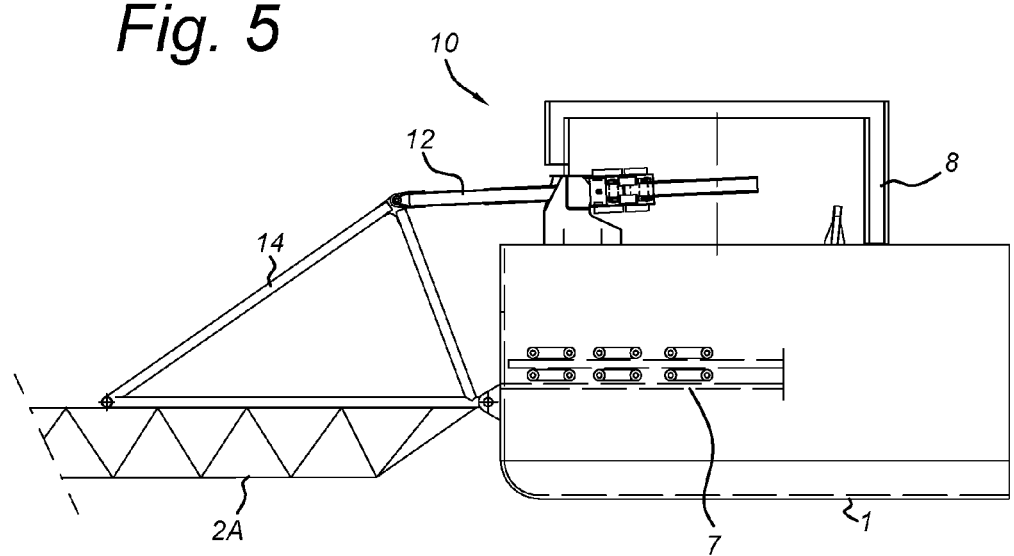
FIG. 5 shows the first stinger section in a horizontal position.
Figure 6:
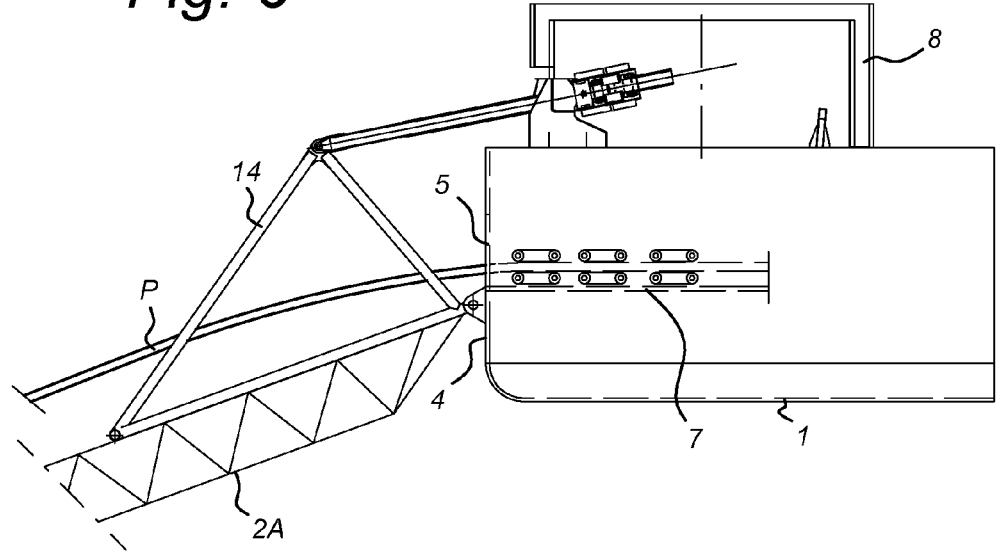
FIG. 6 shows the first stinger section in use.
Figure 7:
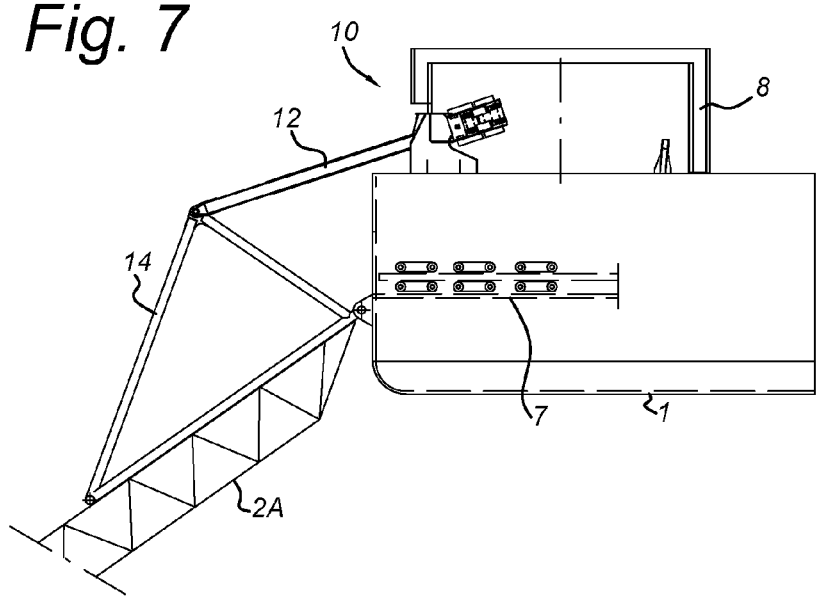
FIG. 7 shows the first stinger section at its maximum deployment angle.
Figure 8:
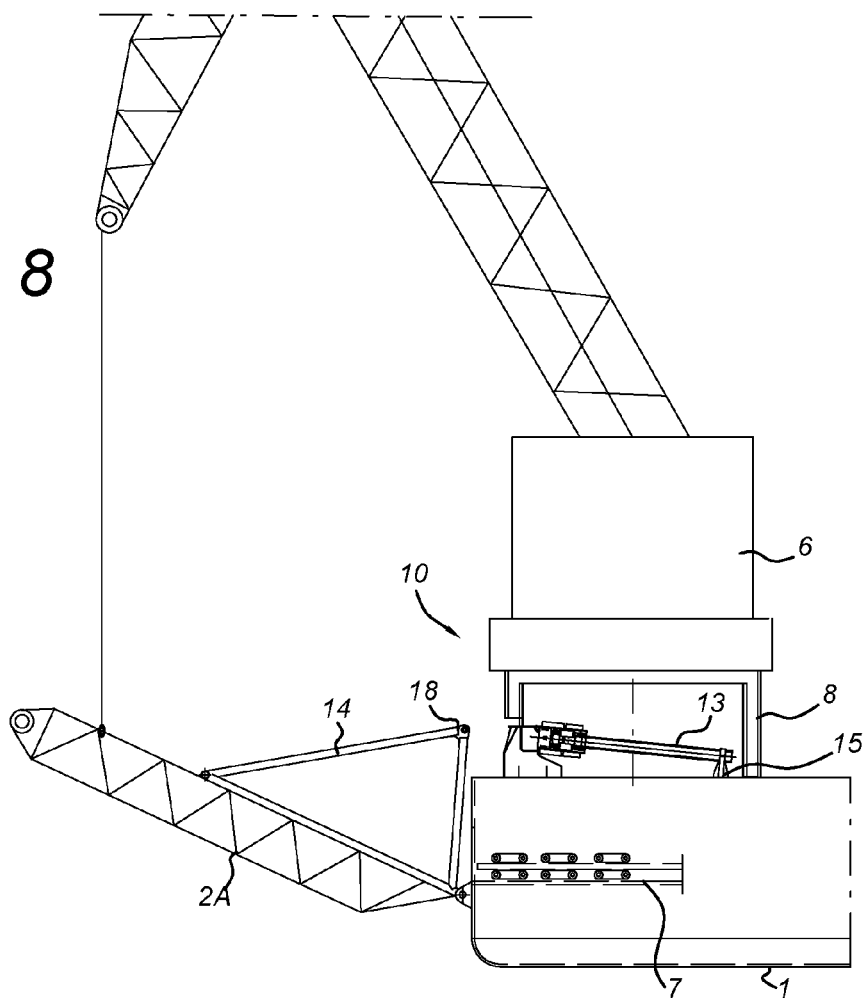
FIG. 8 shows the first stinger section partially disconnected during disassembly.

FIGS. 5 to 7 show views of the stinger handling system 10 corresponding to FIG. 2, in different positions of operation. FIG. 5 shows the first stinger section 2A partially lowered in a horizontal position. FIG. 6, shows the first stinger section 2A in position of use, supporting deployment of a pipeline P. FIG. 7 shows the first stinger section 2A at its maximum deployment angle. FIG. 8 shows the first stinger section 2A disconnected from the links 12 during disassembly.

Operation of the stinger handling system 10 will now be explained with reference to FIGS. 1 to 8. As described, FIGS. 1 and 2 depict the stinger 2 in its raised position, as may be the case when moving with the vessel 1. The weight of the stinger 2 is carried through the tension structure 14, the links 12 and the engaged pins 40 to the first grippers 32. The first grippers 32 are directly mechanically engaged through the jack pivot 36 to the bracket 26. In this manner, the stinger 2 is held in position by a fully mechanical path. In order to lower the stinger 2, the second gripper 34 for each of the jack structures 24A, 24B is moved forwards to the position as depicted for jack structure 24A in FIG. 3. This is achieved by retracting the pins 40 of the respective second gripper 34 from the holes 38 using the pin actuators 42. Once liberated from its engagement with hole 38, the second gripper 34 can be moved forwards along the link 12 by operation of the hydraulic rams 30 through the stroke length L. At this point, the pin 40 will be aligned with the following hole 38 and can be engaged by operation of the pin actuator 42. The pins 40 are spring actuated (not shown), but the pins 40 can enter the holes 38 only if the relevant actuators 42 are driven into the pin engaged position. It will be understood, that although FIG. 3 shows one of the jack structures 24A extended while the other jack structure 24B is retracted, this operation shall take place simultaneously. Suitable control is provided to otherwise prevent operation. Once the jack structures 24A, 24B are in the extended position, the hydraulic rams 30 can be actuated to take the tension in the links 12 via the respective second grippers 34, thereby releasing the force on the pins 40 of the first grippers 32. At this point, the pins 40 of the first grippers 32 can be retracted from their respective holes 38 in the links 12. Once the first grippers 32 are disengaged, the hydraulic rams 30 of both jack structures 24A, 24B can be actuated to lower the links 12 under the weight of the stinger 2 until the second gripper 34 engages against the first gripper as depicted by the retracted position of the jack structure 24A in FIG. 3. At this point, the pins 40 of the first grippers 32 will be aligned with a new hole 38 in the links 12 and can be engaged by the pin actuators 42. This sequence can be repeated step by step until the stinger 2 has been lowered to the desired position. It will be understood that lowering of the links 12 causes lowering of the first stinger section 2A and that the remaining stinger sections 2B, 2C will be lowered by corresponding actions of the crane 6.

The stinger 2 is lowered through the horizontal position shown in FIG. 5 to a chosen working position shown in FIG. 6. Once the stinger 2 reaches the position of use shown in FIG. 6, lowering is stopped and the stinger 2 is locked in position. The stinger 2 is normally locked in its working or resting position by the pins 40. However, once the stinger 2 has reached any position, the two pins 40 of the second grippers 34 are inserted in the holes 38 of the link 12, in order to provide an additional restraint. In this position, the pipeline P may be advanced from the firing line 7 through the doors 5 at the stern 4 of the vessel 1 and deployed over the stinger 2. It is noted that the pipeline P is advanced through the tension structure 14, which must therefore allow sufficient space for passage of junctions and any other installations provided on the pipeline P.

FIG. 7 shows the stinger 2 at its lowest position for deep water pipelay. The links 12 are fully extended through their respective jack structures 24.

Lifting of the stinger 2 takes place by reversing the jacking sequence described above. This may or may not be assisted by the crane 6 in preparation for removal of the stinger 2. FIG. 8 shows the first stinger section 2A fully lifted and supported by the crane 6. The links 12 have been disconnected from the link engagement points 18 and retracted completely inside the crane base 8, where the free ends 13 are supported by the saddles 15. The stinger pivot 16 can then be disconnected and the first stinger section 2A can be lifted away for storage e.g. on the deck of the vessel.

Figure 9:
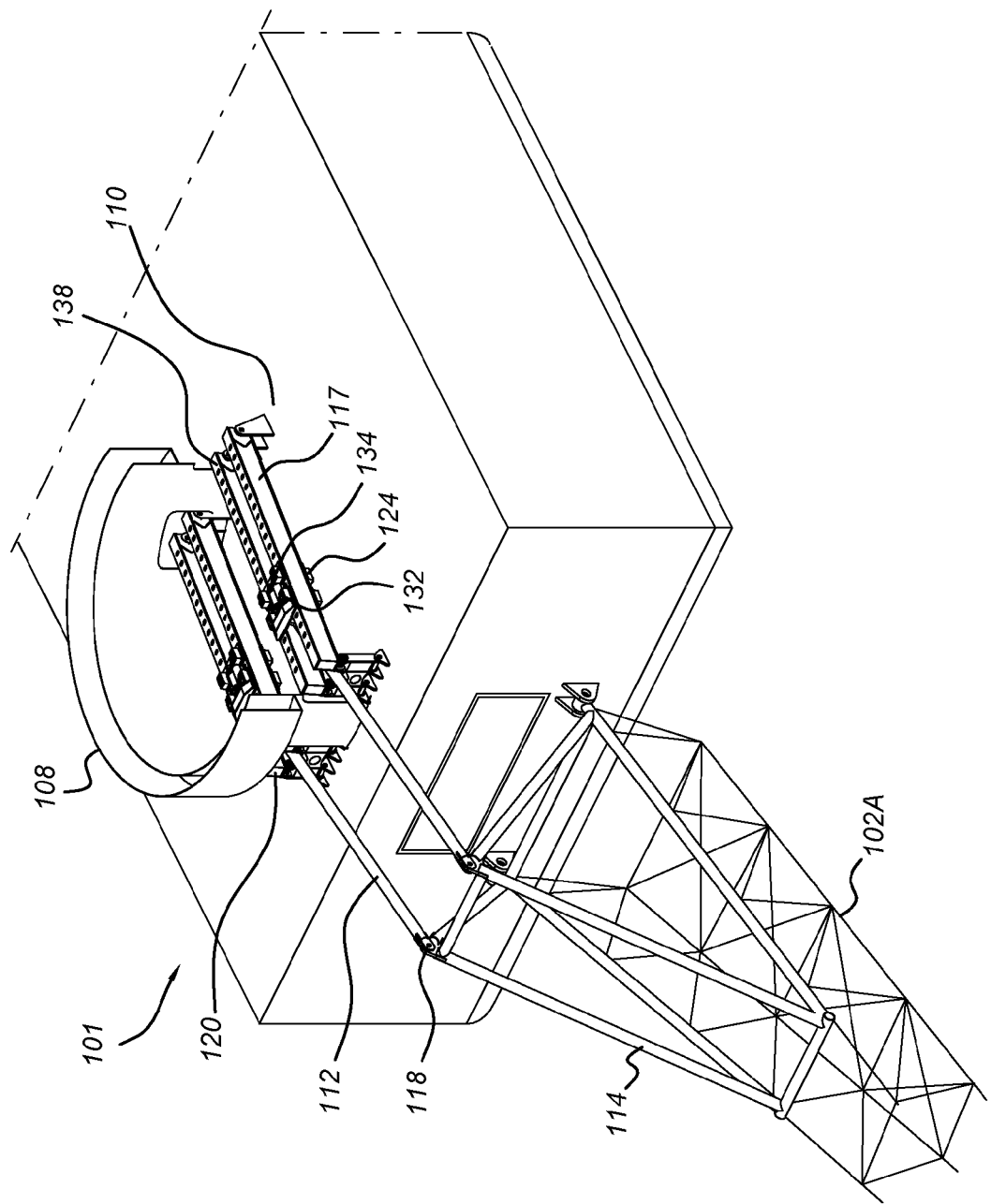
FIG. 9 shows a perspective view of a second embodiment of the invention.

FIG. 9 shows a cut away perspective view of a vessel 101 according to an alternative embodiment of the invention in which like elements to the first embodiment are indicated by the same reference preceded by 100. The stinger handling system 110 of FIG. 9 differs from the first embodiment, in that the jack structures 124 are mobile along rails 117 located within the crane base 108. The jack structures 124, each comprise first 132 and second 134 grippers which engage with holes 138 provided in the rails 117. Engagement is by use of pins and pin actuators (not shown) in the same manner as in the first embodiment. Links 112 are pivoted to each of the first grippers 132 and extend outwards from the crane base 108 through slots 120 to engage with link engagement points 118 on tension structure 114 of the first stinger section 102A. In operation, the embodiment of FIG. 9 operates in substantially the same manner as that of FIGS. 1 to 8. The jack structures 124 can be moved along the rails 117 fore and aft to lift and lower the stinger 102.

Thus, the invention has been described by reference to certain embodiments discussed above. It will be recognized that these embodiments are susceptible to various modifications and alternative forms well known to those of skill in the art. Many modifications in addition to those described above may be made to the structures and techniques described herein without departing from the spirit and scope of the invention. Accordingly, although specific embodiments have been described, these are examples only and are not limiting upon the scope of the invention.

The invention claimed is:

1. A pipelay vessel provided with a crane, the crane having a base supported on a structure of the vessel adjacent to a side of the vessel, the base having a hollow interior, the vessel further provided with a stinger handling system for handling a stinger extending from the side of the vessel, the stinger handling system comprising:
   a link extending out through an opening from the hollow interior towards the side of the vessel for connection to the stinger, the link being arranged to transmit both tensile and compressive loading;
   a jack structure, located within the hollow interior of the crane base and mounted to extend and retract the link from within the crane base to raise and lower the stinger.

2. The vessel according to claim 1, wherein the crane is a tub crane having a generally circular or polygonal base.

3. The vessel according to claim 1, wherein the opening is a vertical slot in the base allowing tilting of the link during extension and retraction.

4. The vessel according to claim 1, wherein the jack structure is located adjacent to the opening.

5. The vessel according to claim 1, wherein the jack structure is pivotably mounted to the vessel for rotation about a horizontal axis.

6. The vessel according to claim 5, wherein the jack structure comprises a hydraulic machine having first and second relatively moveable grippers, each arranged to engage with the link.

7. The vessel according to claim 6, wherein the link comprises holes for engagement by pins provided on the grippers.

8. The vessel according to claim 5, wherein the jack structure is located between the horizontal axis and a free end of the link.

9. The vessel according to claim 1, wherein the jack structure comprises a hydraulic machine arranged to move along a rail, the link being connected to the hydraulic machine.

10. The vessel according to claim 1, wherein the jack structure can be mechanically blocked at a given extension of the link.

11. The vessel according to claim 1, wherein the link is retractable into the hollow interior to a position at which the link does not extend beyond the side of the vessel.

12. The vessel according to claim 1, wherein the stinger handling system comprises a pair of links and a pair of jack structures, which work in parallel to raise and lower the stinger.

13. The vessel according to claim 1, further comprising a stinger, the stinger being pivotably connected to the side of the vessel beneath the crane at a stinger pivot and being pivotably connected to the link at a link engagement point for raising and lowering the stinger.

14. The vessel according to claim 13, wherein the stinger comprises a first elongate stinger section having a rigidly connected tension structure extending dorsally from the first elongate stinger section to the link engagement point.

15. The vessel according to claim 14, wherein the tension structure comprises a pair of tension frames braced together, and a pipeline path along the stinger passes between the tension frames.

16. The vessel according to claim 14, wherein the jack structure is mounted to the vessel through a universal joint allowing self alignment of the link to the stinger tension structure in the horizontal plane.

17. The vessel according to claim 13, wherein the stinger is removable at sea by disconnection from the vessel at the stinger pivot and disconnection from the link at the link engagement point, whereby the stinger can be lifted by the crane to a storage position.

18. A method of stinger deployment on a pipelay vessel having a crane with a hollow base, the method comprising:
   providing a stinger handling system located at least partially within the hollow base and having a rigid link extending from the base and over a side of the vessel;
   pivotably connecting a stinger at the side of the vessel for pivotal movement about a stinger pivot;
   connecting the link to a link engagement point on the stinger at a distance from the stinger pivot; and
   operating the stinger handling system to raise or lower the stinger.

19. The method of claim 18, wherein the stinger handling system further comprises a jack structure, located within the hollow crane base and the method comprises operating the jack to extend and retract the link from within the crane base to raise and lower the stinger.

20. A stinger deployment arrangement for a pipelay vessel, the stinger deployment arrangement comprising:
   a heavy lift crane provided with a cable and winch arrangement and having a base for support on a structure of the vessel adjacent to a side of the vessel, the base having a hollow interior;
   a stinger extending from the side of the vessel beneath the crane; and
   a stinger handling system for raising and lowering the stinger, the stinger handling system comprising:
      a link extending out through an opening from the hollow interior towards the side of the vessel for connection to the stinger, the link being arranged to transmit both tensile and compressive loading;
a jack structure, located within the hollow interior of the crane base and mounted to extend and retract the link from within the crane base to raise and lower the stinger.

* * * * *